US005539389A

United States Patent [19]

Bystrak et al.

[11] Patent Number: 5,539,389

[45] Date of Patent: Jul. 23, 1996

[54] ENHANCED GROUP ADDRESSING SYSTEM

[75] Inventors: Eugene Bystrak, Wolcott; Andrew Berezowski, New Britain, both of Conn.

[73] Assignee: Pittway Corporation, Chicago, Ill.

[21] Appl. No.: 247,863

[22] Filed: May 23, 1994

Related U.S. Application Data

[63] Continuation-in-part of Ser. No. 792,958, Nov. 15, 1991, abandoned.

[51] Int. Cl.[6] .......... H04Q 1/00

[52] U.S. Cl. .......... 340/825.52; 340/825.54; 340/825.08

[58] Field of Search .......... 340/825.54, 825.07, 340/825.08, 825.02, 825.52, 825.53; 342/42

[56] References Cited

U.S. PATENT DOCUMENTS

| | | | |
|---|---|---|---|
| 3,444,521 | 5/1969 | Breese | 340/163 |
| 4,071,908 | 1/1978 | Brophy et al. | 364/900 |
| 4,394,655 | 7/1983 | Wynne et al. | 340/825.36 |
| 4,470,047 | 9/1984 | Vogt et al. | 340/825.36 |
| 4,667,193 | 5/1987 | Cotie et al. | 340/825.08 |
| 4,916,432 | 4/1990 | Tice et al. | 340/518 |
| 4,930,095 | 5/1990 | Yuchi et al. | 364/571.01 |
| 4,940,974 | 7/1990 | Sojka | 340/825.08 |
| 5,089,813 | 2/1992 | DeLuca et al. | 340/825.44 |
| 5,200,743 | 4/1993 | St. Martin | 340/825.54 |
| 5,351,052 | 9/1994 | D'Hont | 342/42 |

FOREIGN PATENT DOCUMENTS

| | | |
|---|---|---|
| 2541052 | 3/1988 | France . |

*Primary Examiner*—Brian Zimmerman
*Attorney, Agent, or Firm*—Dressler, Goldsmith, Shore & Milnamow, Ltd.

[57] ABSTRACT

An apparatus and a method for addressing a plurality of spaced-apart detectors or control units in a multiple zone detection system shortens the time needed for a centrally located control element to communicate with the detectors or units. The control element addresses a plurality of units simultaneously by means of a serial bidirectional communications line. Information can be transmitted time serially to each of the addressed units which is associated with a respective time interval. The addressed units can return, time serially, on the serial communication line a plurality of indicia. The control element associates each indicium with a respective detector by means of the indicium's position relative to other returned indicia.

5 Claims, 5 Drawing Sheets

| Fig. 5a | Fig. 5b |
|---|---|

COMMAND
CHECK SUM
INFORMATION
SOFTWARE RESET
106
106a
100
108
Vdd
ONE CHARACTER:
1342 µS, 44 CLOCK CYCLES

C 5 = 0 : READ DATA FROM IC TO CONTROLLER.
1342 µSOC, 44 CLOCK CYCLES
122 µS, 4 CLOCK CYCLES
122 µS
8O MA, (1) OR 0 MA, (0)

C 5 = 1 : WRITE DATA FROM CONTROLLER TO IC.
1342 µSOC, 44 CLOCK CYCLES
308 µS 10 CLOCK
122 µS 4 CLK

WRITE DATA FROM CONTROLLER TO IC IN FAST SERIAL TRANSMIT MODE.
1342 µSOC, 44 CLOCK CYCLES
122 µS. 4 CLOCK CYCLES TYP. OR 11

ENHANCED GROUP ADDRESSING SYSTEM

This is a continuation-in-part of Bystrak et al., U.S. patent application Ser. No. 07/792,958, Filed Nov. 15, 1991, now abandoned entitled DEVICE GROUP COMMUNICATION FOR FIRE, SECURITY AND CONTROL SYSTEMS.

FIELD OF THE INVENTION

The invention pertains to distributed condition-sensing systems having a plurality of detector units. More particularly, the invention pertains to alarm systems which include a plurality of spaced-apart condition-sensing units, such as heat or smoke detectors, which are individually addressable.

BACKGROUND OF THE INVENTION

Distributed sensor fire alarm systems are known and have been found to be very useful in protecting and providing fire warnings in large structures. For example, one such system is disclosed in U.S. Pat. No. 4,916,432 to Tice, et al. entitled "Smoke And Fire Detection System Communication" assigned to the Assignee of the present invention and incorporated herein by reference.

Known systems provide a plurality of spaced-apart detector units which are linked by a bidirectional communication line to a remote control element. It has been found that the use of serial communications lines, as opposed to parallel lines, is especially desirable. Serial line costs less than does multiple conductor parallel line. In addition, the cost of installation of the serial lines can be substantially less than the cost of installation of parallel lines.

In such systems, the remotely located detecting units each are usually assigned an address. The control element is able to address each of the units in the system either on a systematic or a random basis. Alternately, the units can be polled on a round-robin basis.

Where large numbers of detector units are coupled to the control element via a bidirectional serial communication line, the time to address or poll every one of the units can start to be substantial. Situations can develop wherein with large numbers of devices, on the order of 200 or more, the time to poll all of the units can exceed 4 or 5 seconds.

In addition, in instances where some of the units are so-called control units which carry out functions other than sensing or detecting ambient conditions, it may be necessary to send multiple commands or information to each of those units to effect the desired function. This too can have an adverse effect on total polling time as the number of detectors does not necessarily decrease with the addition of extra control units.

Thus, there continues to be a need for a way to rapidly address large numbers of remote electrical units. Further, there is a need for high speed address schemes wherein the advantages of serial bidirectional communication links are not lost.

Preferably, a high-speed addressing scheme could still utilize serial bidirectional communication links. Further, it would be desirable if such a scheme or system could be implemented without adding significant cost to the control element or to the displaced detector or control units. Preferably, the scheme could be implemented with a hardware installation at the control element and with minimal or no changes to the detector units.

SUMMARY OF THE INVENTION

A system and a method in accordance with the present invention provide high speed addressing of a plurality of displaced electrical units. A multi-level scheme is implemented wherein only groups are addressed so long as there is no indication of an emergency or an alarm condition. If such a condition is noted, units in a group can be addressed individually.

The system includes a central control element which is coupled by a bidirectional communication link to the displaced units. The control unit includes circuitry for determining or specifying a plurality of units, which represents a subset of the total number of units, which is to be addressed.

The control element, via the bidirectional communications link, is able to communicate with each of the units. The control element further includes circuitry for simultaneously transmitting to each member of the plurality of units to be addressed a preselected command which is applicable to or executable by each member of the plurality. In addition, a plurality identifying indicium or address is also transmitted.

Each of the units in the plurality to be addressed includes circuitry for detecting the command as well as at least that portion of the address or indicium which specifies the particular units in the plurality which are being addressed. Each of the units also includes circuitry for detecting the command which has been received and for executing it essentially simultaneously with all of the other addressed units. Further, each of the electrical units includes circuitry for transmitting back to the control element an indicator during a unique time interval assigned thereto.

The bidirectional control link can be a serial communication line. Alternately, communication can be carried out using a set of parallel lines.

Where a serial bidirectional communication link is being used, when the addressed units transmit the indicator value to the control element in response to the executed command, the values are displaced from one another in time on a common transmission line. In this instance, the control unit includes further circuitry to determine if it is necessary to then address each of the members of the plurality individually to further investigate the status of each respective unit.

The method provides for a shortened response time in a system which has a group of spaced-apart addressable units which are interconnected by means of a bidirectional communication link with a control element. The method includes the step of determining a plurality of the units to be addressed. This plurality of units can be a subset of the total group of units.

The control element simultaneously transmits to each member of the plurality a preselected command which is applicable to each member of the plurality along with a plurality identifying indicium or address. The command is detected along with the portion of the indicium which specifies the address of the respective unit.

The addressed units simultaneously execute the command and in response thereto, each transmits an indicator, during a preallocated time interval to the control element. Transmission can be carried out either serially or in parallel.

In this fashion, it is possible to quickly address numerous groups of units and to determine whether the units in any given group are returning to the control element a value indicative of a condition, such as an alarm condition, which needs further investigation.

Numerous other advantages and features of the present invention will become readily apparent from the following detailed description of the invention and the embodiments thereof, from the claims and from the accompanying drawings in which the details of the invention are fully and completely disclosed as a part of this specification.

DETAILED DESCRIPTION OF THE PREFERRED EMBODIMENT

Figure 1:
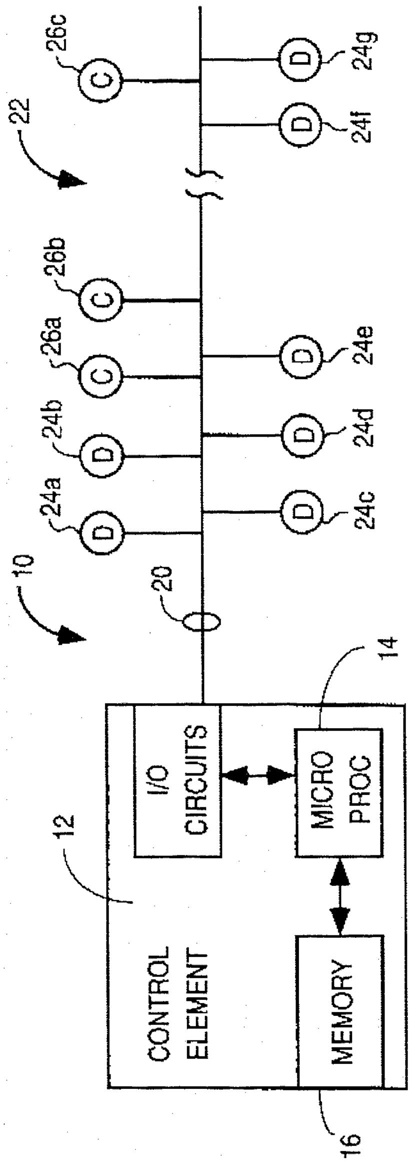
FIG. 1 is an overall block diagram of a system in accordance with the present invention.

While this invention is susceptible of embodiment in many different forms, there are shown in the drawing and will be described herein in detail specific embodiments thereof with the understanding that the present disclosure is to be considered as an exemplification of the principles of the invention and is not intended to limit the invention to the specific embodiments illustrated.

FIG. 1 illustrates schematically a distributed alarm system 10 which incorporates a high speed addressing apparatus in accordance with the present invention. The system 10 includes a central control element 12 which could be at a maintenance or guard station in a building.

The control element 12 could be implemented with hard wired logic. Alternately, the element 12 can be implemented with a programmed processor 14. A memory unit 16 which can include read-write memory as well as read-only memory can store a control program executable by the processor 14.

The control element 12 is coupled to a bidirectional communications link 20. The link 20 can be a serial or a parallel cable. It will be understood that the detailed structure of the communications link 20 is not a limitation of the present invention.

Coupled to the bidirectional communications link 20 is a group of electrical units 22. The group 22 can include a variety of detectors such as detectors 24*a* through 24*g*. The detectors 24*a* through 24*g* can be smoke detectors, temperature detectors, intrusion detectors or the like.

In addition, the system 10 can include a plurality of control units 26*a* through 26*c* which are coupled to the bidirectional communications link 20. The control units, such as 26*a* through 26*c*, can be used to carry out predetermined functions. For example, such control units can be used to activate alarms, turn on or turn off lights, lock or unlock doors or any other such action which it may be desirable to take under the control of the system 10.

Figure 2:
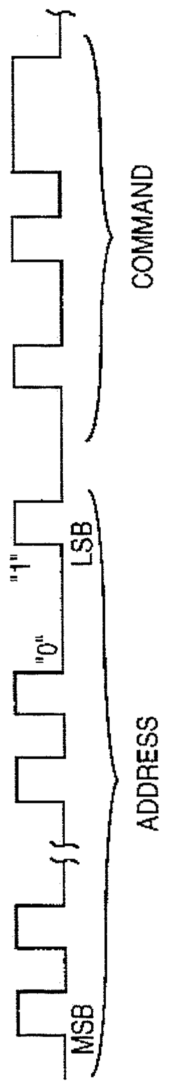
FIG. 2 is an exemplary address and command bit sequence.

FIG. 2 illustrates a representative addressing scheme. The control element 12, via processor 14, includes circuitry and programs to generate bit streams which represent address words and command words. For example, FIG. 2 illustrates a multiple bit address word followed by a multiple bit command word.

The address word and command word combination of FIG. 2 can be transmitted from the control element 12 via the bidirectional link 20 to all of the units 24 and 26. The appropriate addressed unit will respond and then subsequently detect the command word.

Following receipt of the command word the addressed unit, if it is a detector such as a detector 24*a*, will return either a digital or an analog representation, on the bidirectional link 20 to the control element 12. The returned representation is indicative of a sensed ambient condition such as a level of smoke, temperature, whether or not a door or window is open or closed or the like.

Similarly, if the address word addresses one of the control units, such as control unit 26*a*, that unit will, upon detection of the command word, execute the desired command. Subsequently the addressed command unit can return a signal to the control element indicating that the requested command has been carried out.

The system 10 implements a high speed addressing scheme which makes it possible to rapidly address a plurality of detectors within the group 24. Similarly, if desired it is possible to simultaneously address a plurality of command units in the group 26.

Figure 3:
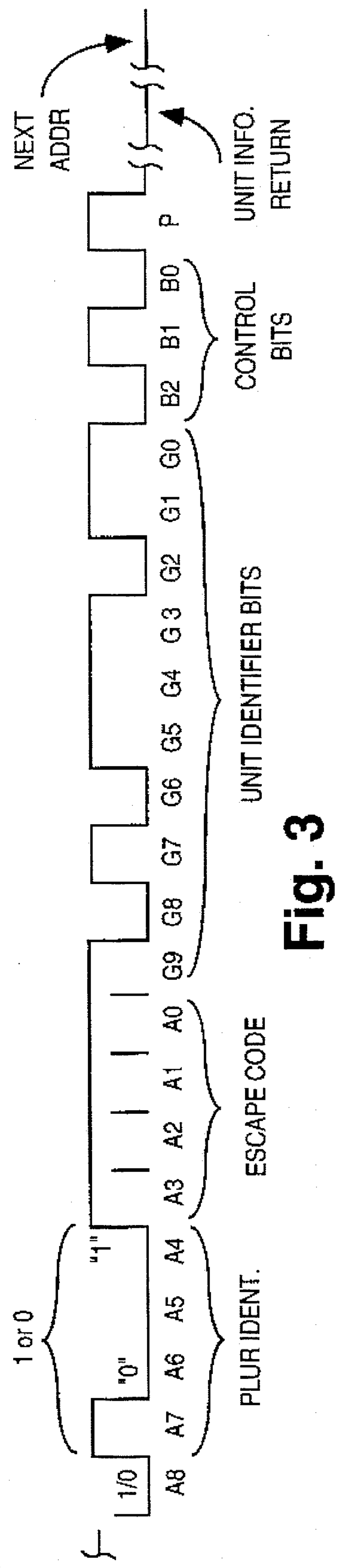
FIG. 3 is an exemplary simultaneous address bit sequence in accordance with the present invention.

FIG. 3 illustrates the addressing scheme of the present invention. An exemplary 9 bit address is illustrated which is formed of bits A8 . . . A0. Bit A8 is the most significant bit. Bit A0 is the least significant bit.

Simultaneous multiple unit addressing can be achieved by configuring the address bits to a bit pattern that the units 24 and 26 do not use or do not recognize as a valid address combination. For example and without limitation, bits A3 . . . A0 can all be set to a 1, representing the hexadecimal character F, and used as an address escape code if that bit combination does not represent an address used in the system 10. Other unused bit combinations can be used in a similar fashion.

In this instance, the most significant bit A8 can be used to identify whether a plurality of detectors, such as 24*a*, 24*b*, 24*c*, or a plurality of control modules or command units, such as 26*a*, 26*b*, is to be addressed in parallel depending on whether the bit is set to a 1 or a 0. Table 1 illustrates 10 different detector unit pluralities or groups identified by the most significant bit A8 being a zero and 10 different control unit pluralities identified by that bit being set to a one.

TABLE 1

| A8 = 0 Detector Groups [A7..A4 addr. bits] | A8 = 1 Module Groups [A7..A4 addr. bits] | G9..G0 Address Range |
|---|---|---|
| 0 | 0 | 1–9 |
| 1 | 1 | 10–19 |
| 2 | 2 | 20–29 |
| 3 | 3 | 30–39 |
| 4 | 4 | 40–49 |
| 5 | 5 | 50–59 |
| 6 | 6 | 60–69 |
| 7 | 7 | 70–79 |

TABLE 1-continued

| A8 = 0 Detector Groups [A7..A4 addr. bits] | A8 = 1 Module Groups [A7..A4 addr. bits] | G9..G0 Address Range |
|---|---|---|
| 8 | 8 | 80–89 |
| 9 | 9 | 90–99 |

A plurality or group of units can be identified by means of a bit combination in address bits A7 . . . A4. (See the left most two columns in Table 1) Finally, juxtaposed with the exemplary 9 bit address combination are 10 unit identifier bits G9 . . . G0.

The 10 unit identifier bits G9 . . . G0 can be used to identify simultaneously up to 10 units in a plurality, specified by plurality identifier bits A7 . . . A4 and type identifier bit A8. Each unit includes circuitry to detect the escape code address bits (A3 . . . A0) and upon doing so, analyze the type bit A8, and the plurality identifier bits (A7 . . . A4). Finally, each unit is able to then determine if its unique identifying bit in the sequence G9 . . . G0 is set to a one.

Figure 4:
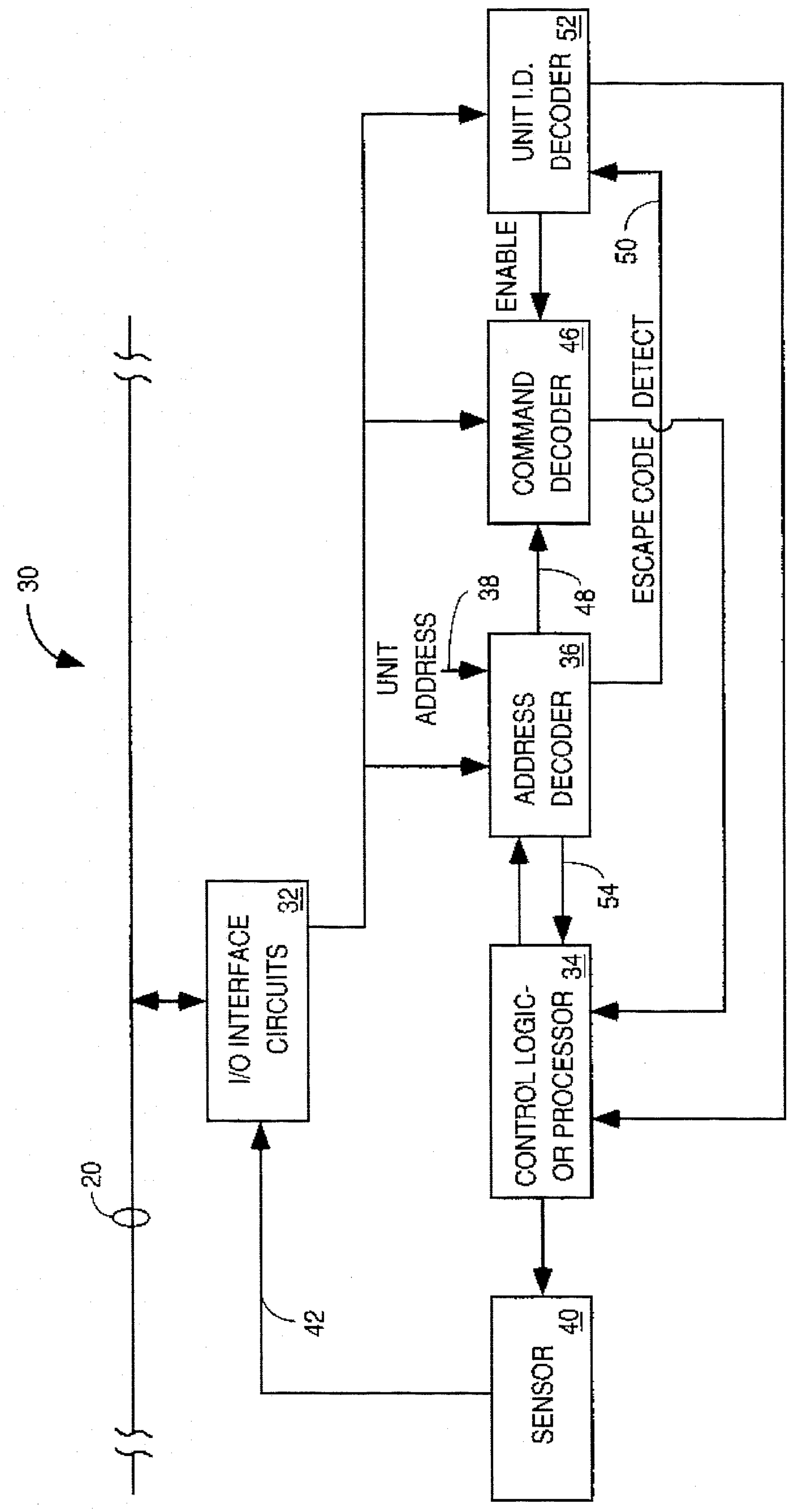
FIG. 4 is a block diagram of a sensor unit usable in the system of FIG. 1.

Once a unit determines that it has been addressed in the present addressing scheme, it can respond appropriately. FIG. 4 is a block diagram of a detector unit 30 usable with the address scheme of Table 1.

The detector unit 30 includes input/output interface circuitry 32 usable to couple the unit to the bidirectional communications link 20. The unit 32 operates under the control of logic or a programmed processor 34. Address decoder circuitry 36 receives address bits off the serial link 20, via interface circuits 32, and can determine whether or not the received address corresponds to the preset unit address 38.

Where the decoded address corresponds to the preset unit address 38 the control circuitry 34, in response thereto, can enable an ambient condition sensor 40 to provide an output signal of 42 to the interface circuits 32. The interface circuits 32 can then transmit the indicator value on the line 42 to the control element via the link 20.

In addition, where the address decoder circuitry 36 determines that the address received from the control element 12 matches the preset unit address 38 a command decoder 46 can be enabled via a line 48. The command decoder 46 can analyze the combination of bits in the command word associated with the unit address and signal the control circuitry 34 as to which command is to be carried out.

Additionally, where the address decode circuitry 36 detects the escape code, the hexadecimal character F, in the address bits A3 . . . A0, a signal on a line 50 can be used to enable unit identifier decoder circuitry 52. Further, the address decoder circuitry 36 can signal the control circuitry 34, via a line 54 if it has detected a match in a plurality identifier bits A7 . . . A4.

If the unit 30 is in the plurality identified by the bits A7 . . . A4 and the unit identifier decoder circuitry 52 signals the control circuitry 34 that the present unit is being addressed, once the command bits B2, B1 and B0 have been decoded in the command decoder circuitry 46 the sensor 40 can be enabled and interface circuitry 32 can transmit via the link 20 a representation of the sensed ambient condition. This transmission can occur in parallel or simultaneously with transmissions from up to 9 other units addressed by the remaining unit identifier bits G9 . . . G0.

Such simultaneous transmission is readily implemented by having the interface circuitry 32 draw current from the link 20 for a period of time representative of the value of the ambient condition present on the line 42. Other simultaneously addressed units can at the same time draw current from the link 20 in accordance with their respective sensed ambient condition values.

The control element 12 can compare the composite current value returned from the simultaneously addressed units to a preset threshold. If the composite value exceeds the preset threshold it is possible that an alarm condition has been detected at one or more of the units. If the composite value does not exceed the preset threshold then the control element can then address the next plurality of units.

In a similar fashion a plurality of command units can be addressed simultaneously and directed, by means of command bits B2, B1 and B0 to carry out a predetermined function. It will be understood that both the detector units and the command units can return information to the control element 12 via the link 20 in either analog or digital form. Subsequently, the next address can be transmitted from the control element 12 to the plurality of units 24 and 26. Other unit circuitry can be using without departing from the spirit and scope of the present invention.

The following two examples illustrate simultaneously addressing of detector units and control units respectively. Example 3 illustrates addressing a single detector unit.

EXAMPLE ONE

The control element 12 sends the following bit pattern via link 20, starting with AS, to address multiple detectors simultaneously.

D/C HIGH ADDR. LOW ADDR. GROUP MEMBER SELECTION BITS CONTROL

| A8 | A7 | A6 | A5 | A4 | A3 | A2 | A1 | A0 | G9 | G8 | G7 | G6 | G5 | G4 | G3 | G2 | G1 | G0 | B2 | B1 | B0 | P |
|---|---|---|---|---|---|---|---|---|---|---|---|---|---|---|---|---|---|---|---|---|---|---|
| 0 | 0 | 0 | 0 | 0 | 1 | 1 | 1 | 1 | 0 | 1 | 0 | 0 | 1 | 0 | 0 | 0 | 0 | 0 | 0 | 1 | 1 | 0 |

This Serial Data Pattern will address detector group 0. In group 0 members 5 and 8 are selected. This is equivalent to simultaneously addressing detector 5 and detector 8.

If either detector's return signal, which could be transmitted as a current pulse on the link 20, is greater than the minimum alarm level then additional single device polls will be required to isolate and validate a possible alarm. The last bit, , "P" is an even parity bit. Odd parity could also be used.

EXAMPLE TWO

The control element 12 sends the following bit pattern via link 20, starting with A8, to address multiple control units simultaneously.

| D/C HIGH ADDR. LOW ADDR. GROUP MEMBER SELECTION BITS CONTROL | | | | | | | | | | | | | | | | | | | | | | |
|---|---|---|---|---|---|---|---|---|---|---|---|---|---|---|---|---|---|---|---|---|---|---|
| A8 | A7 | A6 | A5 | A4 | A3 | A2 | A1 | A0 | G9 | G8 | G7 | G6 | G5 | G4 | G3 | G2 | G1 | G0 | B2 | B1 | B0 | P |
| 1 | 1 | 0 | 0 | 1 | 1 | 1 | 1 | 1 | 1 | 1 | 1 | 0 | 1 | 1 | 1 | 1 | 1 | 1 | 0 | 0 | 0 | 0 |

This Serial Data Pattern will address control unit group 9. In group 9 all members except member 6 are selected. This is equivalent to simultaneously addressing units 90 through 99 with the exception of module 96.

If this pattern is used for two consecutive polls then 9 control modules in group 9 can be activated. Subsequent single device polls are required to confirm control module activation.

EXAMPLE THREE

Single device poll for control unit 99 using a decimal address scheme.

| D/M HIGH ADDR. LOW ADDR. OUTPUT BITS | | | | | | | | | | | | |
|---|---|---|---|---|---|---|---|---|---|---|---|---|
| A8 | A7 | A6 | A5 | A4 | A3 | A2 | A1 | A0 | B2 | B1 | B0 | P |
| 1 | 1 | 0 | 0 | 1 | 1 | 0 | 0 | 1 | 0 | 0 | 0 | 1 |

This Serial Data Pattern will address unit 99. If this pattern is used for two consecutive polls then control unit or module 99 will activate.

Figures 5, 5A:
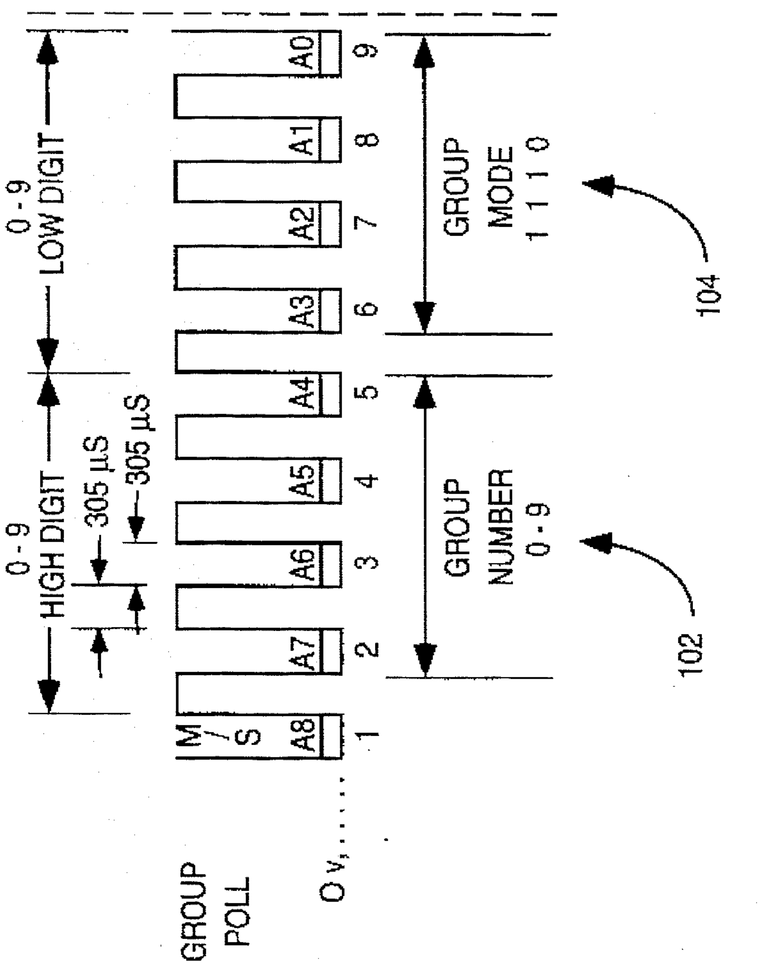
FIG. 5 is a diagram illustrating a communication protocol in accordance with the present invention.

FIG. 5 illustrates a communication protocol 100 in accordance with the present invention. The communication protocol of FIG. 5 could be used, for example, with a system of the type illustrated in FIG. 1 and also could be used with remotely located units, such as the unit 30 of FIG. 4.

The protocol 100 of FIG. 5 includes a 4 bit group specifying sequence 102. The sequence 102 could represent 10 groups such as 0 through 9 or could represent an extended group sequence such as 0 through 15.

A group mode specifying sequence, 104 corresponding to the escape code sequence of FIG. 3 is transmitted subsequent to the group number code sequence 102. A command sequence 106 is transmitted subsequent to the group mode identification sequence 104. To verify the integrity of the data stream, a checksum 106*a* is provided subsequent to the command bits 106.

Subsequent to the command sequence 106, and checksum 106*a* an information time interval 108 is provided. The time interval 108 need not have a fixed duration.

During the time interval 108 information can be transmitted to or received from the members of the plurality 22. The time interval 108 is divided into phases or subintervals I9–I0.

In the embodiment of FIG. 5, one subinterval, corresponding to a single character, is provided for each of the units in the addressed group. Multiple subintervals can be provided if desired to provide for the transmission of multiple characters to or from a single selected unit as discussed subsequently.

Where multiple character sequences are written from the control element to a remote unit or are read from a remote unit to the control element, such transfers take place within a variable length interval associated with that unit. One or more preselected commands can be used to control such variable length transmissions.

For example, and without limitation, the time interval 108 is indicated in FIG. 5 as being subdivided into 10 subintervals, one of which is associated with each of 10 members of an addressed group. It will be understood that the number of members of a group is not a limitation of the present invention.

Members of an addressed group can receive one or more bytes of information from the control element 12 during a respective time interval. It will also be understood that the subintervals of the period 108 need not be the same length. The length can vary between one group member and another as a function of information commands or data being transferred to or received from the respective unit associated with that subinterval.

Figures 5B, 6A, 6B, 6C:
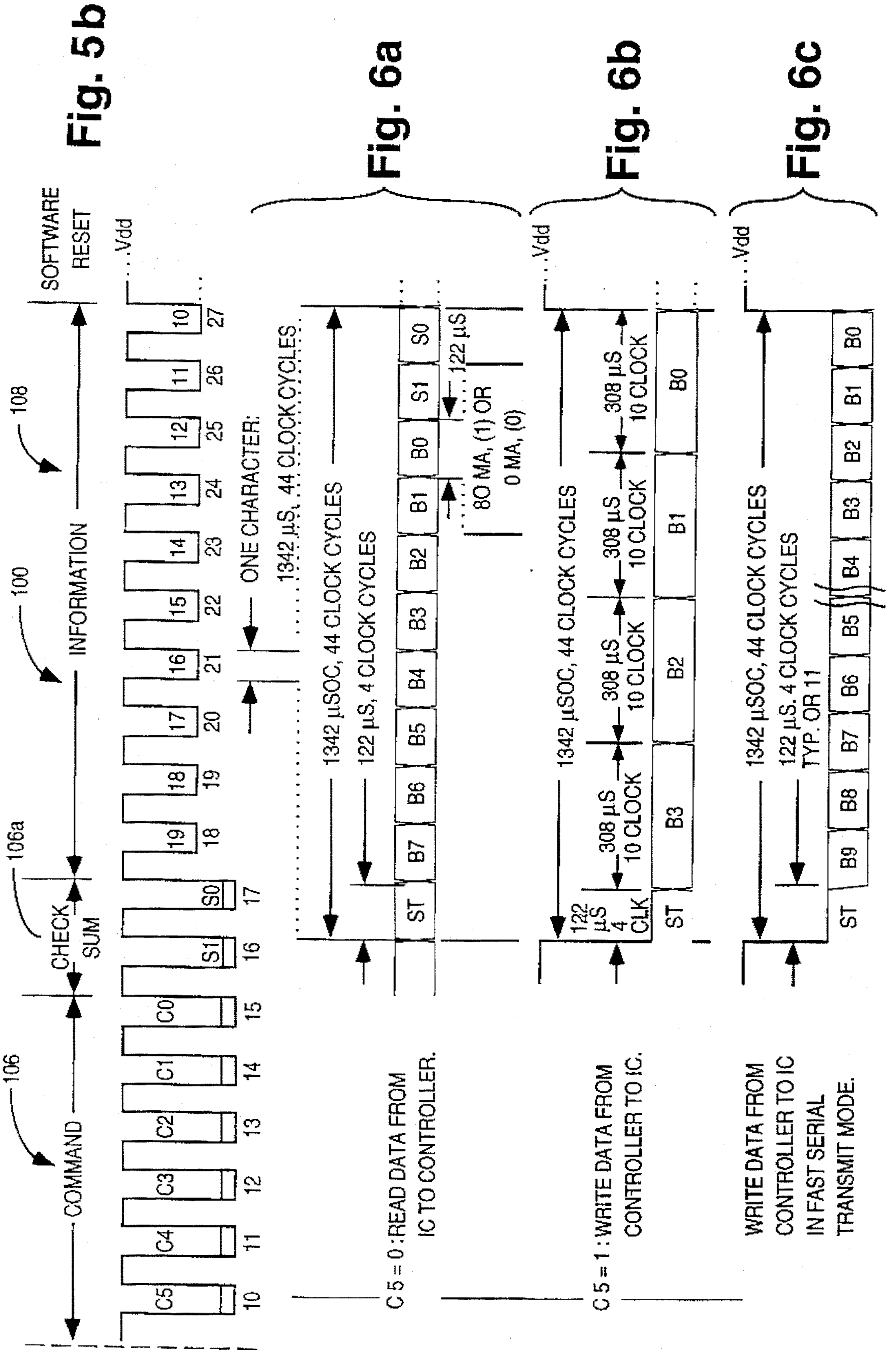
FIG. 6A is a diagram illustrating one form of communication from a remote unit to a control element in accordance with the present invention.
FIG. 6B illustrates one form of a communication from a control element to a remote unit in accordance with the present invention.
FIG. 6C illustrates an alternate form of communication between a control element and a remote unit in accordance with the present invention.

By way of example, FIG. 6A illustrates a transmission of information from unit 6 of an addressed group to the control element 12. The details of transmission are not a limitation of the present invention.

Transmission of information to the control element 12 could take place, without limitation, by modulating a voltage waveform on the link 20 or by modulating a current flow therein. The modulated electrical parameter transmits information in a digital format to the control element 12. This information could, for example, be a digitized representation of a sensor carried on unit 6.

FIGS. 6B and 6C illustrate two alternate forms of transmission from the control unit 12 to a unit in a group during a respective subinterval of the time interval 108. FIG. 6B provides for a lower rate of transmission than does FIG. 6C.

In the transmission format of FIG. 6B, information, such as bits ST, B3 . . . B0 are transmitted by the output circuitry of the control element 12 by modulating a voltage across first and second lines of the link 20 between 0 and 5 volts. The modulated voltage sequence is received by the unit of the group which corresponds to the respective subinterval of the time interval 108.

FIG. 6C illustrates a higher frequency transmission format usable to transmit more extensive files or quantities of information from the control unit 12 to a remote device of an addressed group. The remote device is associated with a subinterval of the interval 108. In one embodiment of the invention, the unit receiving the information transmitted using the format of FIG. 6C could be interfaced to a remote printer. In this instance warning messages or reports could be remotely displayed or printed, The transmission format of FIG. 6C is used preferably with twisted pair communication links having lengths of less than 5000 feet, For longer lengths, the lower frequency format of FIG. 6B could be used.

Figure 7:
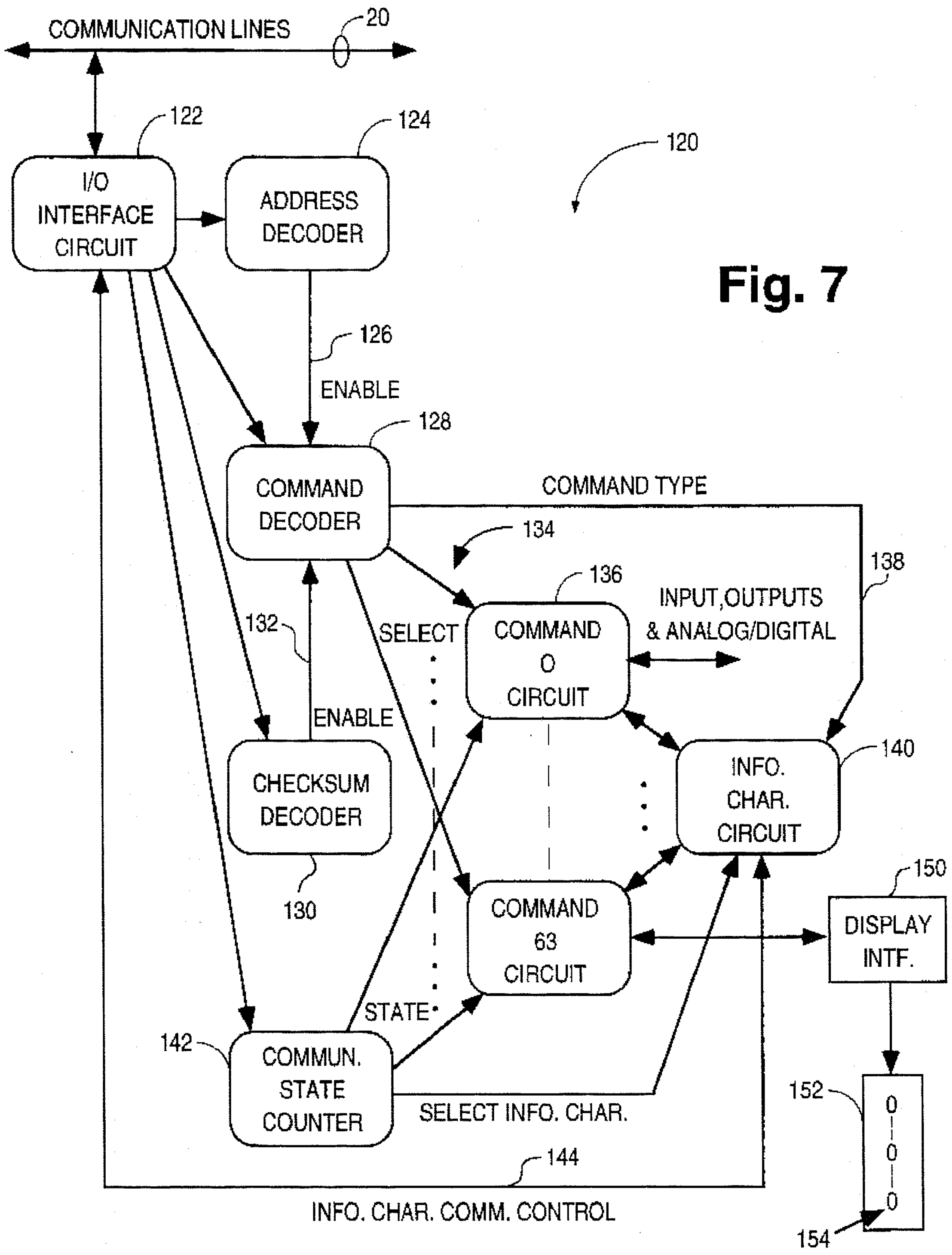
FIG. 7 is a block diagram of a remote unit usable with the communication protocol of FIG. 5.

FIG. 7 is a block diagram of a remote unit 120 usable with the communication protocol of FIGS. 5 and 6A–6C.

The unit 120 includes input/output interface circuitry 122 which enables the unit to communicate with the communication lines 20. Address decoder circuitry 124 determines, from the group address 102 and the group mode character 104, whether or not the unit 120 is in the specified group number. Upon determining that the unit 120 is in the specified group and upon detecting the group mode character 104, the address decoder 124 provides an enable signal on a line 126 to a command decoder 128.

The command decoder 128 detects the command 106 being transmitted from the control element. Assuming that a checksum decoder 130 indicates a correctly received checksum 106A, and thereupon generates an enable signal on a line 132, the command decoder 128 decodes the command 106, transmitted as characters C0 through C5 and generates a corresponding output on one of 64 lines 134.

The outputs on respective lines of the plurality 134 can enable one of up to 64 command circuits indicated at 136. It will be understood that not all command circuits, indicated as 0 through 63 corresponding to the commands 0 through 63 in the command character 106, need be present. The exact number of command circuits as well as a determination as to which command circuits should be present in a given unit, as would be understood by one of skill in the art, depends on the nature of the unit and is not a limitation of the present invention.

The command decoder 128 also provides a decoded command-type signal on a line 138 to an information/character control circuit 140. The circuit 140 can also be coupled in turn to one or more of the command circuits 136.

Each of the command circuits, such as the command 0 circuit of the plurality 136 can, in turn, be coupled to unit input or output circuits. The unit input/output circuits can in turn be coupled to transducers, sensors, output peripheral devices such as printers, solenoids, or motors, Visual or audible display or output devices without limitation can also be carried by or coupled to the unit 120.

The unit 120 also includes a communication state counter 142 which keeps track of information states or phases I9 through I0. The state counter 142 could also keep track of read data states or write data states as illustrated in FIG. 6A through 6C in connection with the transfer of information from the unit to the control element or from the control element to the unit.

Outputs from the communication state counter 142 can be coupled to the information/character control circuitry 140 for the purpose of controlling the transfer of data from the unit to the controller as illustrated in FIG. 6A or for the purpose of transferring commands or data from the control element to the unit as illustrated in either FIG. 6B or FIG. 6C. In this regard, the line 138 provides a command-type indicator to the information/character control circuit indicating whether or not a read from the unit to the control element, indicated by bit C5 being a 0, or a write from the control element to the unit, indicated by a bit C5 being a 1, is expected to take place.

Information transferred from the unit 120 to the control element 12 is transferred between the information/character control circuitry 140 to the I/O interface circuitry 122 via a bi-directional line or lines 144. Information being transferred from the control element 12 to the unit 120 is transferred on the lines 144 to the information/character control circuitry 140. It will be understood that the circuitry 140 could, for example, include substantial storage capacity for the purpose of transferring files or other extensive character sequences to or from unit related input/output devices.

By way of example, the unit 120 can be provided with display interface circuitry 150 which is bidirectionally coupled to one of the command circuits from the plurality 136 such as the command 63 circuit. The display interface 150 can in turn be coupled to a display 152 which might include one or more light-emitting diodes (LEDs) 154.

The members of the plurality 154 can be different colors. Additionally, the interface circuitry 150 can be coupled to an audible annunciator for providing audible indicia under control of the control element 12.

It will be understood that the display 152 can be used for a variety of command and control purposes. For example, one or more of the LEDs 154 can be energized, either continuously or intermittently, in response to one or more bytes of information transmitted from the control element 12 to the device 120. These displays could be used to verify the address of the unit 120, or to ascertain from a region adjacent to the unit 120 the number of times that unit has been cycled or tested successfully or unsuccessfully by the control element 12.

The display 152 could be used to indicate other characteristics of the unit 120. For example, if the unit 120 included a temperature, smoke or other type of fire detector, the display 152 could be used to identify which unit or units has gone into alarm, to indicate percent of alarm of the unit, inoperability, or to provide status information pertaining to detected intrusions or any other condition.

From the foregoing, it will be observed that numerous variations and modifications may be effected without departing from the spirit and scope of the invention. It is to be understood that no limitation with respect to the specific apparatus illustrated herein is intended or should be inferred. It is, of course, intended to cover by the appended claims all such modifications as fall within the scope of the claims.

We claim:

1. A communications system wherein variable length information sequences can be exchanged between a control element and a plurality of units comprising:

a control element;

a plurality of units at least some of which are displaced from said control element;

a common bidirectional communications member coupled between said element and said units;

circuitry, carried by said control element for producing a unit group and command specifying communication; and wherein said element includes transmission/reception circuitry for exchanging the information using said communications member, wherein an interval is provided and wherein one or more units in said group can communicate with said control element during respective, non-overlapping portions of said interval wherein at least one of said units includes an output device capable of receiving variable number of bytes from said control element.

2. A system as in claim 1 wherein said output device includes a printer.

3. A system as in claim 1 wherein first and second different units in said group include circuitry for transmitting information to said element wherein said first unit transmits information of a first length to said element, said second unit transmits information of a second length to said element and wherein said first and said second lengths are different.

4. A system as in claim 3 wherein said communications member includes an electrical cable.

5. A communications system wherein variable length information sequences can be exchanged between a control element and a plurality of units comprising:

a control element;

a plurality of units at least some of which are displaced from said control element;

a common bidirectional communications member coupled between said element and said units;

circuitry, carried by said control element for producing a unit group and command specifying communication; and wherein said element includes transmission/reception circuitry for exchanging the information using said communications member, wherein an interval is provided and wherein one or more units in said group can communicate with said control element during respective, non-overlapping portions of said interval wherein at least one of said units is capable of receiving variable number of bytes from said control element.

* * * * *

UNITED STATES PATENT AND TRADEMARK OFFICE

CERTIFICATE OF CORRECTION

PATENT NO. : 5,539,389

DATED : July 23, 1996

INVENTOR(S) : Eugene Bystrak and Andrew Berezowski

It is certified that error appears in the above-indentified patent and that said Letters Patent is hereby corrected as shown below:

At column 6, line 38, please replace "AS" with --A8--.

At column 6, line 59, please replace "bit,, “P”" with --bit, “P,”--.

At column 9, line 49, please replace "hi-directional" with --bi-directional--.

Signed and Sealed this

Twentieth Day of May, 1997

Attest:

BRUCE LEHMAN

*Attesting Officer* *Commissioner of Patents and Trademarks*